(12) United States Patent
Suzuki

(10) Patent No.: US 7,182,169 B2
(45) Date of Patent: Feb. 27, 2007

(54) STEERING SYSTEM FOR SMALL-SIZED VEHICLE

(76) Inventor: Yasuhiro Suzuki, c/o Yamaha Hatsudoki Kabushiki Kaisha, 2500 Shingai, Iwata-shi, Shizuoka-ken, 438-8501 (JP)

(\*) Notice: Subject to any disclaimer, the term of this patent is extended or adjusted under 35 U.S.C. 154(b) by 212 days.

(21) Appl. No.: 10/975,968

(22) Filed: Oct. 28, 2004

(65) Prior Publication Data

US 2005/0284250 A1    Dec. 29, 2005

Related U.S. Application Data

(60) Provisional application No. 60/573,418, filed on May 24, 2004.

(51) Int. Cl.
*B62D 5/00* (2006.01)
*B62D 1/16* (2006.01)
*F16C 23/00* (2006.01)

(52) U.S. Cl. .................. 180/426; 180/439; 180/440; 180/908; 280/775; 280/779; 384/206; 384/208

(58) Field of Classification Search ............... 180/426, 180/439, 440, 444, 908; 280/775, 779; 384/206, 384/208
See application file for complete search history.

(56) References Cited

U.S. PATENT DOCUMENTS

| | | | | |
|---|---|---|---|---|
| 6,394,656 | B1 * | 5/2002 | Williams | 384/450 |
| 6,860,638 | B2 * | 3/2005 | Fish | 384/300 |
| 6,966,399 | B2 * | 11/2005 | Tanigaki et al. | 180/444 |

\* cited by examiner

*Primary Examiner*—Lesley D. Morris
*Assistant Examiner*—Marc A. Scharich
(74) *Attorney, Agent, or Firm*—Keating & Bennett, LLP

(57) ABSTRACT

A steering system for a small-sized vehicle is capable of coaxially arranging a steering shaft and a power steering apparatus with high accuracy. In the steering system, when the power steering apparatus is connected to the steering shaft, a plurality of bearings support the steering shaft on a vehicle body frame, and where the axis of the steering shaft arranged at a desired position is a reference axis, at least one of the bearings is configured to compensate for an inclination of the steering shaft or further, to compensate for a deviation from the bearing which is centered with respect to the reference axis.

22 Claims, 5 Drawing Sheets

STEERING SYSTEM FOR SMALL-SIZED VEHICLE

Applicant(s) claim(s) benefit under 35 U.S.C. § 119(e) of U.S. provisional application No. 60/573,418 filed May 24, 2004.

BACKGROUND OF THE INVENTION

1. Field of the Invention

The present invention relates to a steering system for a small-sized vehicle such as a saddle type three-wheel vehicle or four-wheel vehicle used for farming, an ATV (All Terrain Vehicle) for sportive traveling off-road, a golf cart, and other suitable vehicles. More specifically, the present invention relates to a steering system having a power steering apparatus.

2. Description of the Related Art

Generally, a small-sized vehicle used for traveling off road has the following structure. Front and rear wheels, each having a balloon tire with low pressure and wide diameter, are disposed at the front and rear of a vehicle body frame, and an engine unit is mounted between the front and rear wheels. Furthermore, a steering shaft is arranged between the left and right front wheels, and a wheel-type steering handle or a bar-type steering handle is attached to the upper end of the steering shaft. Such a small-sized vehicle can travel off road at will by turning the steering handle from side to side.

In recent years, some users have demanded further improvements in operability when maneuvering the small-sized vehicle to reduce a load on operating the steering handle.

Accordingly, a power steering apparatus that is connected to the steering shaft has been suggested to provide an assisting steering force by this power steering apparatus.

Where the above-described power steering system is provided, a structure is adopted in which an input shaft (which is an input unit of a direct steering force by an operator) of a reduction gear of the power steering apparatus is coupled to a lower end of the steering shaft, and an output shaft of the reduction gear (which is an output unit of the resultant force of the direct steering force and the assisting steering force) is coupled to a tie rod via a link mechanism. In such a structure, the steering shaft and the input shaft of the above-described reduction gear must be coaxially arranged with high accuracy so as to facilitate turning of the steering shaft. On the other hand, a vehicle body frame on which the above-described steering shaft and reduction gear are mounted is generally manufactured by bending and forming steel pipes into desired shapes and joining them by welding or the like, such that the dimensional accuracy thereof is not very high. Therefore, it is difficult to coaxially arrange the above-described steering shaft and reduction gear with high accuracy.

SUMMARY OF THE INVENTION

To overcome the problems described above, a preferred embodiment of the present invention provides a steering system for a small-sized vehicle in which a steering shaft and a reduction gear can be coaxially arranged with high accuracy.

Another preferred embodiment of the present invention provides a bearing structure for a steering shaft which supports the steering shaft such that an inclination or further, a deviation with respect to a reference axis thereof, is compensated for.

Still another preferred embodiment of the present invention provides a coupling mechanism which couples a steering shaft and an input shaft of a power steering system such that a displacement between the steering shaft and the input shaft in an axial direction is compensated for.

According to various preferred embodiments of the present invention, when a power steering apparatus supported on a vehicle body frame and supplying an assisting steering force to a steering shaft is connected to the steering shaft, a plurality of bearings support the steering shaft on the vehicle body frame, and when the axis of the steering shaft arranged at a desired position is a reference axis, at least one of the bearings is configured to compensate for an inclination of the steering shaft or further, a deviation from the bearing which is centered with respect to the reference axis.

When the bearing is displaced from a desired mounting position or mounting angle due to deviations in the dimensional accuracy of the vehicle body frame, and the steering shaft is arranged so as to be inclined relative to or deviated from the reference axis, the inclination or deviation is compensated for by the bearing itself, and thus the steering shaft is supported in a desired position and mounting angle.

According to one preferred embodiment of the present invention, the bearing which compensates for the inclination is defined by a ball joint including a ball portion having a spherical shape projecting outwardly in a radial direction of the steering shaft and attached to a middle portion of the steering shaft and a ball support portion having a recessed spherical shape and slidably engaged with the ball portion. Further, the ball support portion is supported by a frame side support portion provided on the vehicle body frame.

In this preferred embodiment of the present invention, when the steering shaft inclines from the reference axis, the ball portion and the ball support portion slide according to the inclination, such that the inclination of the steering shaft is compensated for, and thus the steering axis is supported in a desired inclination.

According to another preferred embodiment of the present invention, the ball support portion and the frame side support portion are coupled such that a support position of the steering shaft is adjustable in a direction that is substantially perpendicular to the axial direction.

When the ball portion and the ball support portion slide at the ball joint to compensate for the inclination of the steering shaft, the relative position of the ball joint with the frame side support portion may change. In this preferred embodiment of the present invention, the change of the relative position is compensated for by the ball support portion and the frame side support portion being adjustably coupled in the direction that is substantially perpendicular to the axial direction.

According to another preferred embodiment of the present invention, the bearing which compensates for the inclination has a bearing main body whose inner surface has a substantially hourglass shape and supports the steering shaft in a rotatable manner and in a manner capable of compensating for inclination of the steering shaft with respect to the reference axis and a bearing support portion supporting the bearing main body. Further, the bearing support portion is supported by a frame side support portion provided on the vehicle body frame.

In this preferred embodiment of the present invention, when the steering shaft is inclined relative to the reference axis, the bearing main body and the steering shaft move relative to one another according to the inclination. Therefore, the inclination of the steering axis is compensated for, and thus, the steering shaft is supported in a desired position.

According to another preferred embodiment of the present invention, the bearing support portion and the frame side support portion are coupled such that a support position of the steering shaft is adjustable in an axial perpendicular direction.

When the bearing main body and the steering shaft move relative to one another to compensate for the inclination of the steering shaft, a relative position of the bearing support portion supporting the bearing main body with the frame side support portion may change. In this preferred embodiment of the present invention, the change of the relative position is compensated for by the bearing support portion and the frame side support portion being adjustably coupled in the axial direction.

According to another preferred embodiment of the present invention, a coupling pipe couples the steering shaft and an input shaft of the power steering apparatus so as to be relatively movable in an axial direction and relatively immovable in a rotational direction.

When the inclination of the steering shaft is compensated for as described above, a displacement in the axial direction may occur between the steering shaft and the input shaft of the power steering apparatus. In this preferred embodiment of the present invention, the displacement is compensated for by the coupling pipe coupling the steering shaft and the input shaft.

According to another preferred embodiment of the present invention, the coupling pipe is a serration joint configured such that a serration provided on an inner peripheral surface is engaged with serrations provided on outer peripheral surfaces of the steering shaft and the input shaft. Further, a slit is provided on the coupling pipe to penetrate the coupling pipe in the axial direction, and a fastening bolt fastening the coupling pipe in a radial direction is screwed into the coupling pipe substantially perpendicular to the slit.

In this preferred embodiment of the present invention, the displacement between the steering shaft and the input shaft in the axial direction is compensated for by the coupling pipe being coupled by the serrations with the steering shaft and the input shaft. Further, by fastening the fastening bolts, the coupling pipe elastically deforms such that the gap of the slit is reduced, and therefore the coupling pipe is securely connected with the steering shaft and the input shaft.

Other features, elements, characteristics, steps and advantages of the present invention will become more apparent from the following detailed description of preferred embodiments with reference to the attached drawings.

DETAILED DESCRIPTION OF PREFERRED EMBODIMENTS

Hereinafter, preferred embodiments of the present invention will be described with reference to the attached drawings. Note that the indications of front, rear, left and right in the description of the preferred embodiments represent the front, rear, left, and right when viewed from an operator seated on a seat.

Figure 1:
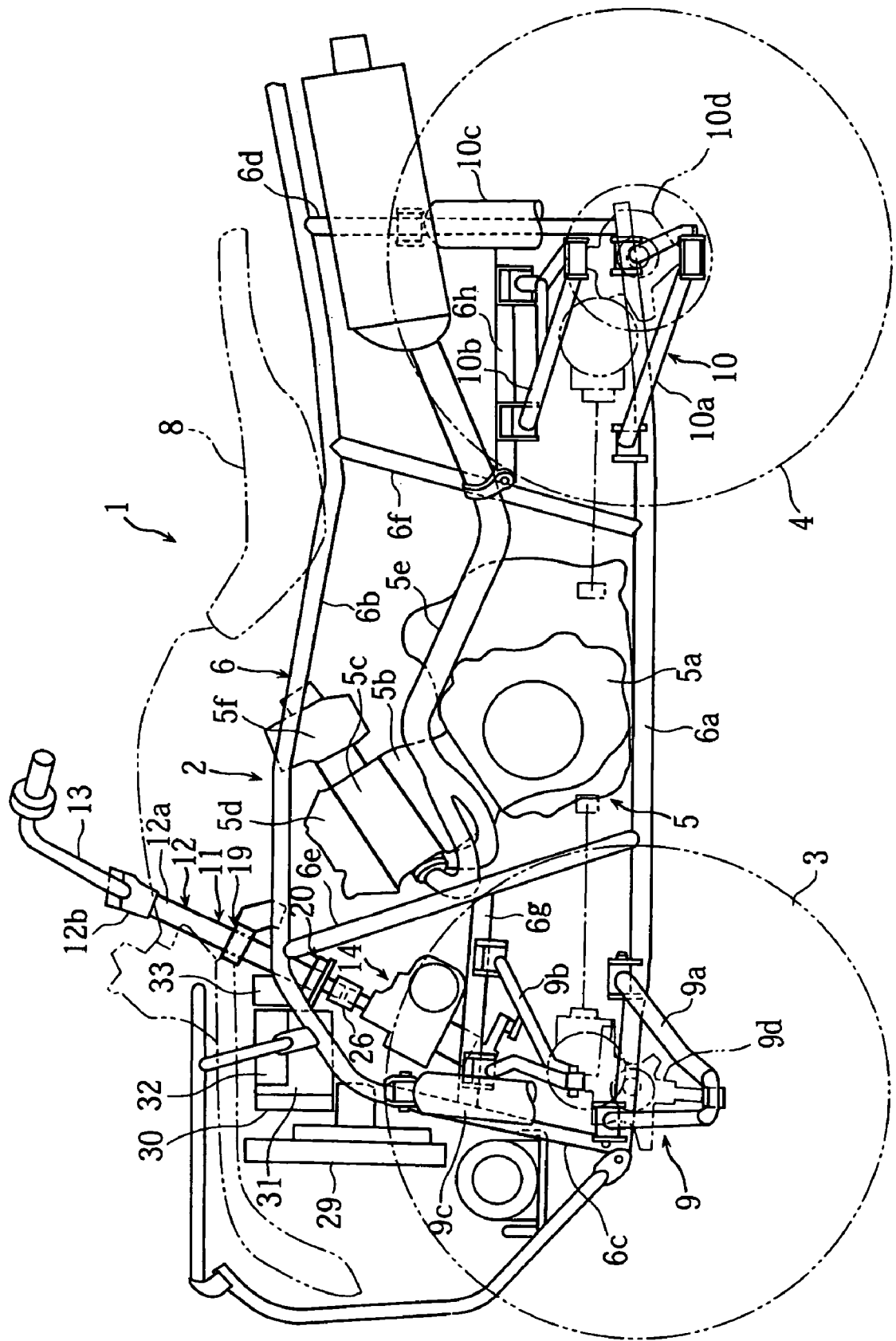
FIG. 1 is a left side view of a small-sized vehicle for traveling off road having a steering system according to one preferred embodiment of the present invention, in which some portions are shown by solid lines, and some portions are shown by chain-double dashed lines and dotted lines.
Figure 2:
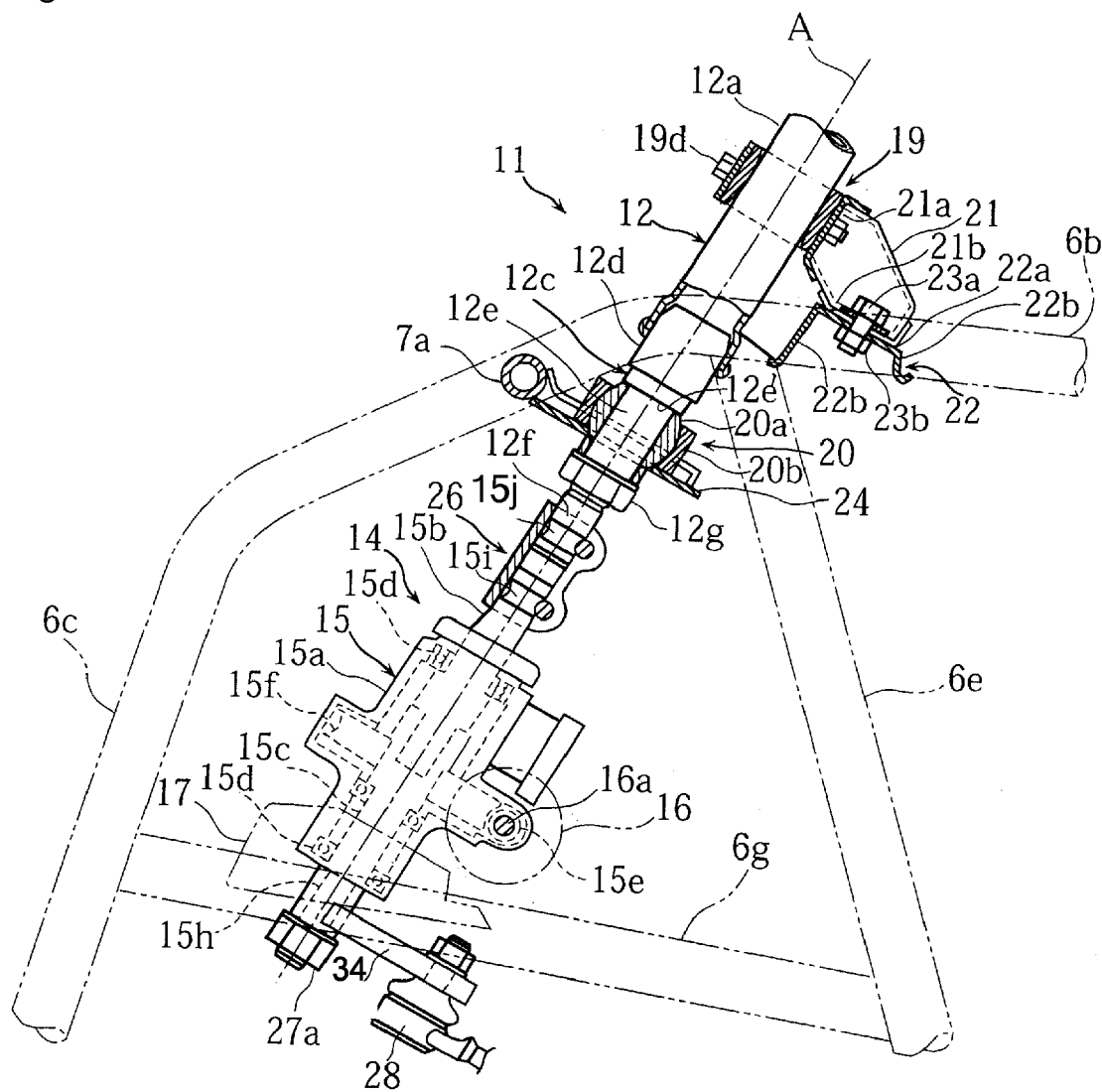
FIG. 2 is a left side view of the steering system, in which a frame portion is shown by chain-double dashed lines, the steering system is shown by solid lines, and a portion of the steering system is shown by a cross-section.
Figure 3:
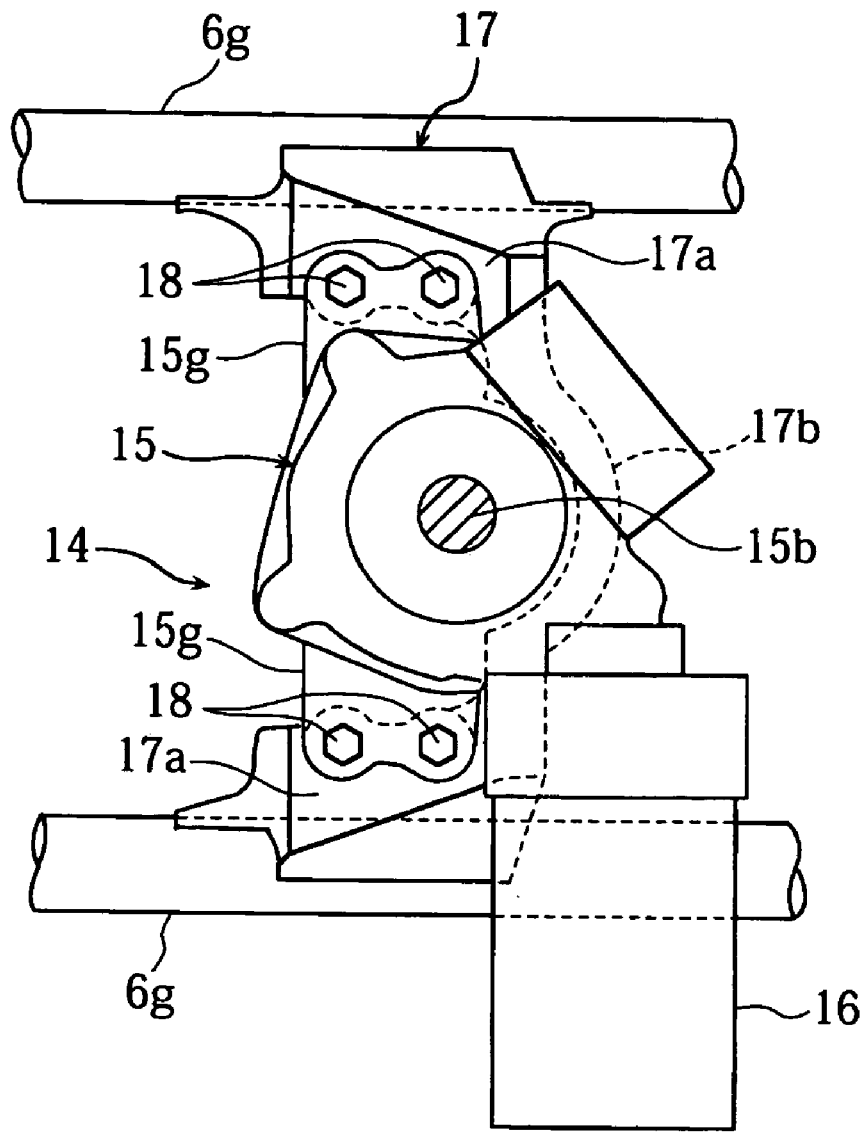
FIG. 3 is a plan view illustrating an attaching state of the power steering apparatus to a vehicle body frame in a preferred embodiment of the present invention.
Figure 4:
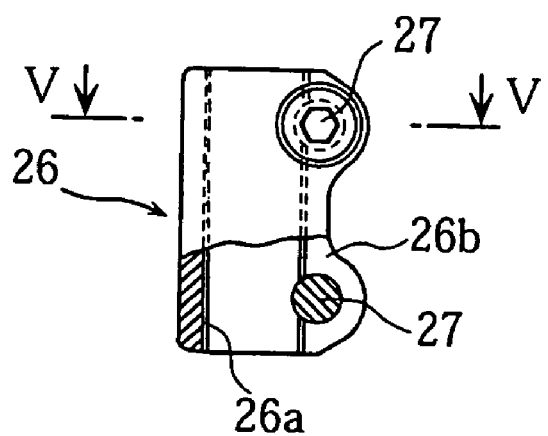
FIG. 4 is a side view of a coupling pipe in a preferred embodiment of the present invention, a lower half portion of which being shown by a cross-section.
Figure 5:
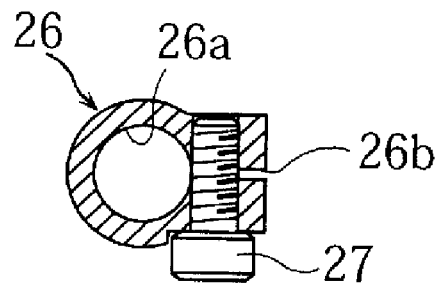
FIG. 5 is a cross-sectional plan view of the coupling pipe.
Figure 6:
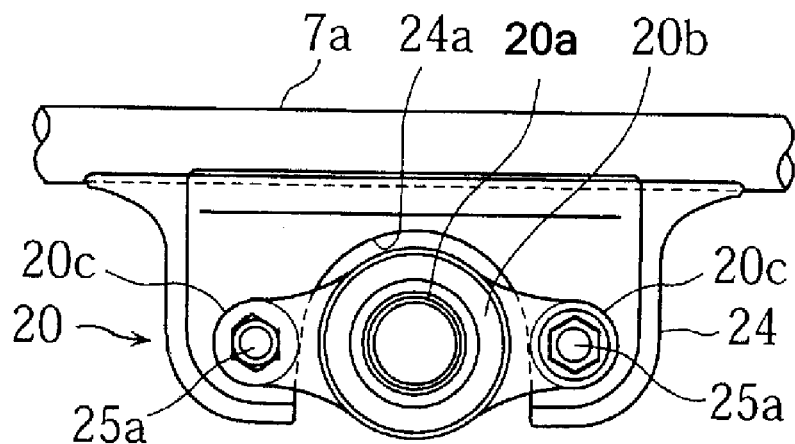
FIG. 6 is a plan view of a lower bearing supporting a lower portion of the steering shaft in a preferred embodiment of the present invention.
Figure 7:
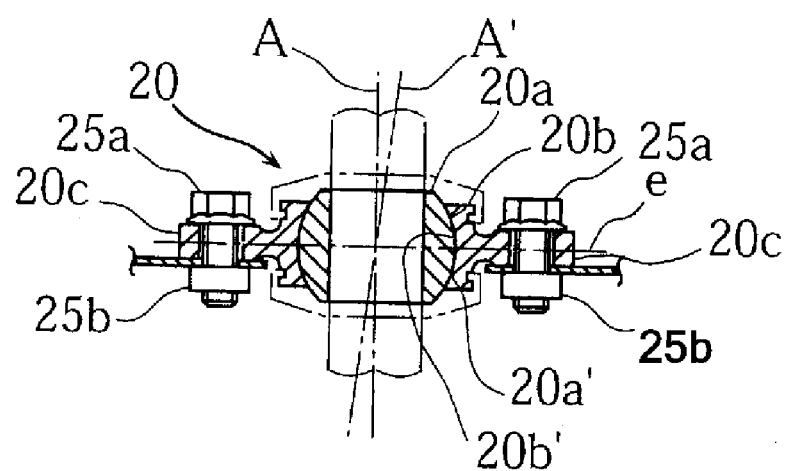
FIG. 7 is a cross-sectional side view of the lower bearing.
Figure 8:
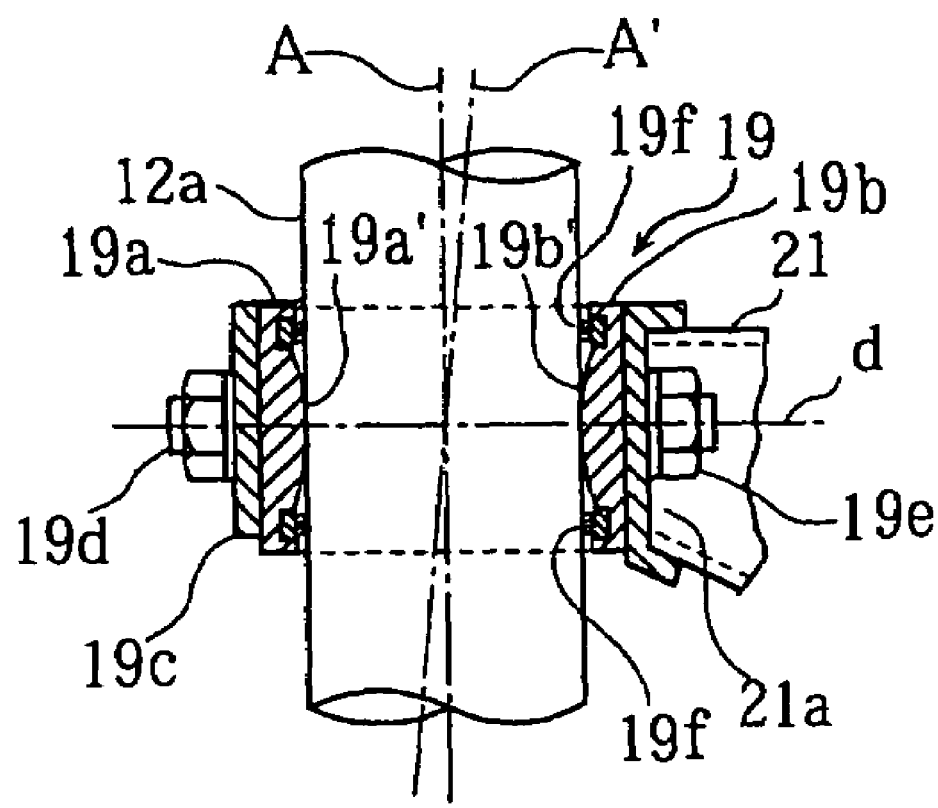
FIG. 8 is a cross-sectional side view of an upper bearing supporting an upper portion of the steering shaft in a preferred embodiment of the present invention.

In FIG. 1 to FIG. 8, "1" denotes a small-sized vehicle for traveling off road. This small-sized vehicle 1 includes a vehicle body frame 2, left and right front wheels 3, 3 arranged at left and right front portions of the vehicle body frame 2, left and right rear wheels 4, 4 arranged at left and right rear portions of the vehicle body frame 2, an engine unit 5 mounted between the front wheels 3 and the rear wheels 4 of the vehicle body frame 2, and a steering system 11 disposed between the left and right front wheels 3, 3.

The vehicle body frame 2 is a so-called double cradle type in which left and right side frames 6, 6 are connected to each other by a plurality of cross pipes. Each of the side frames 6 includes a lower pipe 6a arranged approximately at the height of the axes of the front and rear wheels 3, 4 and extending in the front and rear direction, and an upper pipe 6b arranged approximately at the height of the lower end of a saddle type seat 8 and extending in the front and rear direction. At the front end portion of the upper pipe 6b, a front end vertical pipe 6c is formed by bending the upper pipe 6b to extend downward. The lower end portion of the front end vertical pipe 6c is connected to the front end portion of the lower pipe 6a. Further, the lower pipe 6a and the upper pipe 6b are connected to each other by a rear end vertical pipe 6d, and intermediate vertical pipes 6e, 6f on the front and rear sides. Furthermore, the front end vertical pipe 6c and the intermediate vertical pipe 6e on the front side and the rear end vertical pipe 6d and the intermediate vertical pipe 6f on the rear side are coupled to each other by intermediate horizontal pipes 6g, 6h arranged in parallel with the lower pipe 6a, respectively.

The engine unit 5 is mounted in a space surrounded by the lower and upper pipes 6a, 6b, and the front and rear intermediate vertical pipes 6e, 6f. In front of an engine case 5a having a built-in crankshaft of the engine unit 5 and a built-in transmission, a cylinder block 5b, a cylinder head 5c, and a head cover 5d are stacked and fastened to the engine case 5a. Further, an exhaust unit 5e is connected to the front wall of the cylinder head 5c. The exhaust unit 5e extends rearward approximately at the height of the cylinder block 5b. Further, a carburetor 5f is connected to the rear wall of the cylinder head 5c.

In front of the steering system 11, a radiator 29 is disposed for cooling the cooling water of the engine unit 5 by traveling air. Between the radiator 29 and the steering system 11, various on-vehicle components are mounted, such as a battery 30, a control unit 31 for the engine 5, a control unit 32 for a power steering apparatus which will be described later, a relay 33, and other suitable components.

The left and right front wheels 3, 3 are supported by a double wishbone type front-wheel suspension system 9 in a vertically moveable and horizontally steerable manner. The front-wheel suspension system 9 includes a lower arm 9a supported by the front portion of the lower pipe 6a in a vertically moveable manner, an upper arm 9b supported by the intermediate horizontal pipe 6g on the front side in a vertically moveable manner, and a cushion unit 9c extending between the front end vertical pipe 6c and the lower arm 9a.

Also, the left and right rear wheels 4, 4 are supported by a double wishbone type rear-wheel suspension system 10 in a vertically moveable manner. The rear-wheel suspension system 10 includes a lower arm 10a supported by the rear portion of the lower pipe 6a in a vertically moveable manner, an upper arm 10b supported by the intermediate horizontal pipe 6h on the rear side in a vertically moveable manner, and a cushion unit 10c extending between the rear end vertical pipe 6d and the lower arm 10a.

Between tip portions of the lower arm 9a and the upper arm 9b, a knuckle 9d is provided for coupling the front wheel to the lower arm 9a and the upper arm 9b via a ball joint and for supporting the front wheel 3 in a rotatable manner. Similarly, between the lower arm 10a and the upper arm 10b, a knuckle 10d is provided for coupling the rear wheel to the lower arm 10a and the upper arm 10b in an axially rotatable manner and for supporting the rear wheel 4 in a rotatable manner.

The steering system 11 includes a steering shaft 12 arranged substantially at the center between the left and right front wheels 3, 3, a steering handle 13 attached to the upper end of the steering shaft 12, and an electric motor-driven power steering apparatus 14 connected to the lower end of the steering shaft 12. The steering shaft 12 and input and output shafts, which will be described later, of the power steering apparatus 14 are arranged in a straight line tilting rearward.

The power steering apparatus 14 includes a reduction gear 15 and a drive motor 16 integrally fixed to a reduction gear case 15a of the reduction gear 15. Inside the reduction gear case 15a, an input shaft 15b and an output shaft 15c are coaxially arranged. The input and output shafts 15b, 15c are integrally coupled and supported in a rotatable manner by the reduction gear case 15a via a bearing 15d. A worm wheel 15f is fixed to the output shaft 15c, and a worm 15e fixed to the output shaft 16a of the drive motor 16 is engaged with the worm wheel 15f.

The input shaft 15b is an input unit of a direct steering force generated by an operator. Inside the reduction gear 15, an assisting steering force of the drive motor 16 output by a desired gain with respect to the direct steering force is added to the direct steering force. The output shaft 15c is an output unit of a combined force of the direct steering force and the assisting steering force. The reduction gear 15 is provided with a detecting sensor (not-shown) for detecting the direct steering force, or further with a speed sensor (not shown) for detecting the rotation speed of the input shaft 15b. According to their detection values, the output torque of the drive motor 16 is controlled, or further an output rotation speed thereof is controlled.

The worm 15e attached to the output shaft 16a of the drive motor 16 is engaged with the worm wheel 15f at a rear side portion of the steering shaft 12. The drive motor 16 is arranged so as to protrude to one side (the left side in this preferred embodiment) from the center line in the vehicle width direction.

Furthermore, a lower end portion 15h of the output shaft 15c protruding downward from the reduction gear case 15a is coupled to the knuckles 9d, 9d which support the front wheels 3, 3 via a link mechanism. The link mechanism preferably includes a pitman arm 34 fastened and fixed by a nut 27a to the lower end portion 15h, and a tongue rod having one end coupled to the pitman arm 34 via a ball joint 28 and the other end coupled to the knuckle 9d for the front wheel.

Mount flanges 15g integrally formed with a lower portion of the reduction gear case 15a are fastened and fixed by bolts 18 to a support bracket 17. The support bracket 17 includes left and right support boss portions 17a, 17a and a coupling portion 17b coupling the support boss portions 17a, 17a with each other. The left and right support boss portions 17a, 17a are fixed to be bridged across the left and right intermediate horizontal pipes 6g, 6g on the front side. The coupling portion 17b preferably has an arc shape extending along the outer peripheral shape of the reduction gear case 15a, and the coupling portion 17b is located in close proximity to the outer peripheral surface of the reduction gear case 15a.

As described above, since the left and right flange portions 15g of the reduction gear case 15a are fastened and fixed on the support boss portions 17a, the reduction gear case 15a functions as a reinforcing member disposed between the left and right intermediate horizontal pipes 6g, 6g, and therefore, the stiffness of the vehicle body frame 6 is improved accordingly.

The steering shaft 12 preferably has a substantially cylindrical column portion 12a, a handle mounting bracket 12b which is fixed to the upper end portion of the column portion 12a and to which the steering handle 13 is detachably mounted, and a coupling shaft portion 12c fixed coaxially to the lower end portion of the column portion 12a.

An upper portion 12d of the coupling shaft portion 12c is engaged with and inserted into a lower end opening of the column portion 12a and welded to the column portion 12a. Further, in a central portion in the axial direction of the coupling shaft portion 12c, a pivotal support portion 12e having a smaller diameter than the upper portion is provided. Furthermore, on the lower end portion of the coupling shaft portion 12c, a coupling portion 12f having a serration on an outer peripheral surface thereof is provided. Incidentally, the column portion 12a and the coupling shaft portion 12c may be integrally formed.

An intermediate portion in the vertical direction of the column portion 12a is pivotally supported by an upper bearing 19, and the pivotal support portion 12e is pivotally supported by a lower bearing 20.

The upper bearing 19 includes two pieces, a cap-side piece 19a and a base-side piece 19b. Inner peripheral surfaces 19a', 19b' of the cap-side piece 19a and the base-side piece 19b preferably have substantially hourglass shapes in which the inner diameter increases as the distance in the axial direction (upper side and lower side) from the center "d" increases. Accordingly, when the column portion 12a and the steering shaft 12 inclines from a reference axis A when they are arranged at a desired position to an axis A', the upper bearing 19 compensates for the inclination, such that the column portion 12a is supported in a rotatable manner without any obstruction.

A through hole is provided in the left and right inner peripheral surfaces 19a', 19b' which are bearing portions of the cap-side piece 19a and the base-side piece 19b, respectively, and the cap-side piece 19a and the base-side piece 19b are fixed to a front end portion 21a of a bearing bracket 21 by a through bolt 19d from the front side of a holding plate 19c and a nut 19e. On upper and lower portions of the upper bearing 19, oil seals 19f for preventing foreign objects from entering the inner peripheral surfaces 19a', 19b' are respectively attached. Further, a base end portion 21b of the bearing bracket 21 is mounted on a mounting surface 22a of a base bracket 22 and fixed in a detachable manner by a bolt 23a and a nut 23b. The base bracket 22 is preferably made of sheet metal having a substantially U-shaped cross-section and includes the mounting surface 22a and leg portions 22b, 22b. The base bracket 22 is bridged across the left and right upper pipes 6b, 6b of the vehicle body frame 2 and welded to the pipes 6b, 6b.

Here, a mounting position of the bearing bracket 21 on the base bracket 22 is adjustable in a substantially perpendicular direction of the axis A of the steering shaft 12 by increasing the diameter of a bolt hole for inserting the bolt 23a. Specifically, when a displacement of the mounting position of the steering shaft 12 occurs due to an influence of the dimensional accuracy of the vehicle body frame, the displacement can be compensated for. The cap-side piece 19a and the base-side piece 19b define a bearing main body, and the bearing bracket 21 defines a bearing support portion.

The lower bearing 20 includes a ball joint having a ball portion 20a and a ball support portion 20b which slidably engages with the outside peripheral surface of the ball portion 20a. Specifically, after the ball portion 20a is inserted into a cylindrical hole of the ball support portion 20b, the ball support portion 20b is plastically deformed by forging, and the cylindrical hole is deformed so as to have a spherical surface along an outer periphery of the ball portion 20a, and thus, the ball support portion 20b is slidable with the outer peripheral surface of the ball portion 20a. A bearing surface 20a' of the ball portion 20a preferably has a substantially spherical shape extending outwardly in the radial direction of the steering shaft 12. Specifically, when seen in a cross-section along the axis, the bearing surface 20a' becomes smaller in diameter as it goes outside (upper side and lower side) from the center "e" in the axial direction. This ball portion 20a is attached to a middle portion of the steering shaft 12, namely, a pivotal support portion 12e, and fastened and fixed by a nut 12g to abut a step portion 12e' of the pivotal support portion 12e.

A bearing surface 20b' of the ball portion 20b has a recessed spherical shape disposed outwardly in the radial direction of the steering shaft 12. Specifically, when seen in a cross-section along the axis, the diameter of the bearing surface 20b' decreases as the distance from the center "b" in the axial direction increases.

On the ball support portion 20b, flanges 20c, 20c are integrally provided so as to protrude to the left and right in plan view. The flanges 20c are mounted on a bearing bracket 24 that is a frame side support portion and fastened and fixed by bolts 25a and nuts 25b. The bearing bracket 24 is preferably made of a sheet metal, on which a recessed portion 24a for inserting the steering shaft 12 is provided. The bearing bracket 24 is welded on the bearing support pipe 7a. The bearing support pipe 7a is arranged to bridge across upper slanted portions of the left and right front end vertical pipes 6c and is fixed on both the pipes 6c.

Here, a mounting position of the lower bearing 20 on the bearing bracket 24 is adjustable in a direction that is substantially perpendicular to the axis A of the steering shaft 12 by increasing the diameter of bolt holes for inserting the bolts 25a. Specifically, when a displacement of the mounting position or angle of the steering shaft 12 from a desired state occurs, the displacement is compensated for.

The coupling portion 12f of the steering shaft 12 and the input shaft 15b of the power steering apparatus 14 are coupled by a coupling pipe (serration joint) 26 to be relatively non-rotatable and relatively movable in the axial direction before later-described bolts 27 are fastened. Accordingly, a rotational force can be transmitted between both of the axes, and a displacement in the axial direction between both the axes is compensated for at the time of assembly.

The coupling pipe 26 preferably has a substantially cylindrical shape having a serration 26a provided on its inner peripheral surface extending in the axial direction. The serration 26a is engaged with the serration provided on the outer periphery of the coupling portion 12f of the steering shaft 12 and with a serration provided on the outer peripheral surface of an upper end portion of the input shaft 15b so as to be relatively movable in the axial direction.

Further, a slit 26b extends through the coupling pipe 26 in the axial direction. Furthermore, fastening bolts 27 are screwed into the coupling pipe 26 to penetrate the slit 26b portion in a direction that is substantially perpendicular to the axial direction. Thus, the diameter of the coupling pipe 26 is slightly reduced, such that the serrations firmly engage with each other.

Here, the bolts 27 engage with recessed grooves 15j, 15i provided on the coupling portion 12f and the input shaft 15b. There is a gap in the vertical direction between each of the bolts 27 and each of the recessed grooves 15j, 15i. The gaps enable the relative positions of the coupling portion 12f and the input shaft 15b to be movable in the vertical direction before the bolts 27 are fastened, such that their positions can be adjusted. After the two bolts 27 are fastened, the coupling of the coupling portion 12f and the coupling pipe 26 as well as the coupling of the coupling pipe 26 and the input shaft 15b are respectively immovable both in the rotational direction and in the axial direction. Incidentally, when only one bolt 27 is provided to fasten one of the upper portion or the lower portion, the coupling portion 1 2f and the input shaft 15b are relatively non-rotatable and relatively movable in the axial direction with each other.

In the steering system 11 in this preferred embodiment, when an operator turns the steering handle 13 from side to side so as to input a direct steering force (human-power torque) by the operator to the steering shaft 12, this human-power torque is detected by a torque detecting sensor (not shown). An assisting torque signal according to the detected human-power torque is calculated by an ECU, and a current corresponding to the assisting torque is supplied to the drive motor 16 of the power steering apparatus 14. Thus, the drive motor 16 outputs the assisting steering force, which enables the operator to perform steering with decreased steering force.

Here, assembly work of the steering system 11 of this preferred embodiment to the vehicle body frame 2 is performed by the following procedure. First, the power steering system 14 is mounted on the support bracket 17, and the mount flanges 15g of the reduction gear 15 are fastened and fixed by the bolts 18. Further, the coupling pipe 26 is attached to the input axis 15b of the reduction gear 15. Then, the lower bearing 20 is attached to a desired portion of the steering shaft 12, the coupling portion 12f is inserted into the coupling pipe 26, and the lower bearing 20 is mounted on the bearing bracket 24. Furthermore, the steering shaft 12 is engaged with the base-side piece 19b of the upper bearing 19. Subsequently, the lower bearing 20 is fastened and fixed by bolts on the bearing bracket 24, and the cap-side piece 19a is attached to the base-side piece 19b of the upper bearing 19 and fastened and fixed by a bolt with the holding plate 19c.

In the above-described assembly, depending upon the dimensional accuracy of the vehicle body frame 2, there is a possibility that the axis of the steering shaft 12 inclines to a position A' with respect to the reference axis A at the time that the steering shaft 12 is arranged at a desired position.

In this preferred embodiment, the lower bearing 20 and the upper bearing 19 are configured so as to compensate for an inclination of the steering angle 12 with respect to the reference axis A, such that the steering shaft 12 can be arranged in a desired position.

Specifically, the lower bearing 20 includes the ball joint having the ball portion 20a and the ball support portion 20b slidably engaging with the ball portion 20a. Accordingly, when the steering shaft 12 inclines from the reference axis A due to the influence of the dimensional accuracy of the vehicle body frame, the ball portion 20a and the ball support portion 20b slide according to the inclination, such that the inclination of the steering shaft 12 is compensated for, and eventually the steering shaft 12 is supported in a desired position.

When the ball portion 20a and the ball support portion 20b slide at the lower bearing 20 to compensate for the inclination of the steering shaft 12, a relative position of the lower bearing 20 with respect to the frame side support portion may be displaced from a desired position. In this preferred embodiment, the displacement of the relative position is compensated for by the ball support portion 20b being adjustable in a direction that is substantially perpendicular to the axial direction with respect to the bearing bracket 24 that is the frame side support portion by one or both of the gaps between the two through holes of the flange 20c for the bolts 25a and the outer periphery of the bolts 25a and the gaps between the two through holes of the bearing bracket for the bolts 25a and the outer periphery of the bolts 25a.

Further, the inner surface of the bearing main body 19b of the upper bearing 19 preferably has an hourglass shape projecting inwardly in the radial direction, such that, when the steering shaft 12 inclines from the reference axis A, the bearing main body 19b and the steering shaft 12 move relative to one another according to the inclination. Therefore, the inclination of the steering axis 12 is compensated for, and the steering axis 12 is supported in a desired position.

When the bearing main body 19b and the steering shaft 12 move relative to one another to compensate for the inclination of the steering shaft 12, a relative position of the bearing main body 19b with respect to the frame side support portion may be displaced. In this preferred embodiment, this displacement of the relative positions is compensated for by the bearing bracket 21, which is the frame side support portion supporting the bearing case 19a, being adjustable in the direction that is substantially perpendicular to the axial direction with respect to the base bracket 22 by one or both of the gaps between the two through holes of the base end portion for the bolts 23a and the outer periphery of the bolts 23a and the gaps between the two through holes of the base bracket 22 for the bolts 23a and the outer periphery of the bolts 23a.

As described above, when the inclination of the steering shaft 12 is compensated for, a displacement in the axial direction may occur between the steering shaft 12 and the input shaft 15b of the power steering apparatus 14. In this preferred embodiment, since both of the steering shaft 12 and the input shaft 15b are coupled by serrations, the displacement can be compensated for.

By fastening the two fastening bolts 27, the coupling pipe 26 is elastically deformed such that the gap of the slit 26b decreases, and therefore the coupling pipe 26 is securely connected with the steering shaft 12 and the input shaft 15b.

Incidentally, only one fastening bolt 27 may be used. Moreover, the cushion unit 9c may be disposed between the front end vertical pipe 6c and the upper arm 9b, and the cushion unit 10c may be disposed between the rear end vertical pipe 6d and the upper arm 10b.

The present invention may be embodied in other specific configurations without departing from the spirit or essential characteristics thereof.

The present invention is not limited to the above-described preferred embodiments, but can be modified within the scope of the attached claims. Further, the technologies disclosed in the above-described preferred embodiments can be used in combination, as desired.

What is claimed is:

1. A steering system for a vehicle, comprising:
   a vehicle body frame;
   a steering shaft supported by said vehicle body frame so as to be rotatable and arranged to transmit a steering force applied to a steering handle attached to an upper end thereof to a wheel to be steered via a link mechanism;
   a power steering apparatus connected to said steering shaft and arranged to supply an assisting steering force to said steering shaft; and
   a plurality of bearings supporting said steering shaft on said vehicle body frame;
   wherein
   an axis of said steering shaft when arranged at a desired position defines a fixed reference axis, and at least one of said plurality of bearings is configured to compensate for at least one of an inclination of said steering shaft with respect to the fixed reference axis and a deviation of said steering shaft from said at least one of said plurality of bearings which is centered with respect to the fixed reference axis.

2. The steering system for the vehicle according to claim 1, wherein at least one of said bearings includes a ball joint having a ball portion having a substantially spherical shape projecting outward in a radial direction of said steering shaft and attached to a middle portion of said steering shaft and a ball support portion having a recessed spherical shape and slidably engaging with the ball portion, and the ball support portion is supported by a frame side support portion provided on said vehicle body frame.

3. The steering system for the vehicle according to claim 2, wherein the ball support portion and the frame side support portion are coupled such that a support position of said steering shaft is adjustable in a direction that is substantially perpendicular to an axial direction of said steering shaft.

4. The steering system for the vehicle according to claim 2, wherein the frame side support portion includes a bearing bracket.

5. The steering system for the vehicle according to claim 1, wherein at least one of said bearings includes a bearing main body having an hourglass shaped inner surface projecting inwardly in a radial direction and rotatably supporting said steering shaft so as to compensate for the inclination of said steering shaft with respect to the fixed reference axis and a bearing support portion supporting the bearing main body, and the bearing support portion is supported by a frame side support portion provided on said vehicle body frame.

6. The steering system for the vehicle according to claim 5, wherein the bearing support portion and the frame side support portion are coupled such that a support position of said steering shaft is adjustable in a direction that is substantially perpendicular to an axial direction of the steering shaft.

7. The steering system for the vehicle according to claim 5, wherein the frame side support portion includes a bearing bracket.

8. The steering system for the vehicle according to claim 1, further comprising a coupling pipe coupling said steering shaft and an input shaft of said power steering apparatus at a time of assembly so that said steering shaft and the input shaft are relatively movable in an axial direction and relatively immovable in a rotational direction such that a displacement between said steering shaft and the input shaft in the axial direction at the time of assembly is compensated for.

9. The steering system for the vehicle according to claim 8, wherein said coupling pipe is a serration joint configured such that a serration provided on an inner peripheral surface of said coupling pipe is engaged with serrations provided on outer peripheral surfaces of said steering shaft and the input shaft, a slit is provided on said coupling pipe to penetrate said coupling pipe in an axial direction, and a fastening bolt fastening said coupling pipe in a radial direction is screwed into said coupling pipe.

10. The steering system for the vehicle according to claim 1, wherein said plurality of bearings includes an upper bearing and a lower bearing; said upper bearing includes a bearing main body having an hourglass shaped inner surface projecting inwardly in a radial direction and rotatably supporting said steering shaft so as to compensate for inclination of said steering shaft with respect to the fixed reference axis and a bearing support portion supporting the bearing main body, and the bearing support portion is supported by a frame side support portion provided on said vehicle body frame; and said lower bearing is a ball joint having a ball portion having a substantially spherical shape projecting outward in a radial direction of said steering shaft and attached to a middle portion of said steering shaft and a ball support portion having a recessed spherical shape and slidably engaging with the ball portion, and the ball support portion is supported by a frame side support portion provided on said vehicle body frame.

11. The steering system for the vehicle according to claim 10, wherein the frame side support portion includes a bearing bracket.

12. A vehicle, comprising:
a vehicle body frame;
a wheel attached to the vehicle body frame;
a steering handle connected to the vehicle body frame and said wheel so as to turn the wheel; and
a steering system including:
a steering shaft supported by said vehicle body frame and arranged to transmit a steering force applied to the steering handle attached to an upper end thereof to the wheel to be turned via a link mechanism;
a power steering apparatus connected to said steering shaft and arranged to supply an assisting steering force to said steering shaft; and
a plurality of bearings supporting said steering shaft on said vehicle body frame; wherein
an axis of said steering shaft when arranged at a desired position defines a fixed reference axis, and at least one of said plurality of bearings is configured to compensate for at least one of an inclination of said steering shaft with respect to the fixed reference axis and a deviation of said steering shaft from said at least one of said plurality of bearings which is centered with respect to the fixed reference axis.

13. The vehicle according to claim 12, wherein at least one of said bearings includes a ball joint having a ball portion having a substantially spherical shape projecting outward in a radial direction of said steering shaft and attached to a middle portion of said steering shaft and a ball support portion having a recessed spherical shape and slidably engaging with the ball portion, and the ball support portion is supported by a frame side support portion provided on said vehicle body frame.

14. The vehicle according to claim 13, wherein the ball support portion and the frame side support portion are coupled such that a support position of said steering shaft is adjustable in a direction that is substantially perpendicular to an axial direction of said steering shaft.

15. The vehicle according to claim 13, wherein the frame side support portion includes a bearing bracket.

16. The vehicle according to claim 12, wherein at least one of said bearings includes a bearing main body having an hourglass shaped inner surface projecting inwardly in a radial direction and rotatably supporting said steering shaft so as to compensate for the inclination of said steering shaft with respect to the fixed reference axis and a bearing support portion supporting the bearing main body, and the bearing support portion is supported by a frame side support portion provided on said vehicle body frame.

17. The vehicle according to claim 16, wherein the bearing support portion and the frame side support portion are coupled such that a support position of said steering shaft is adjustable in a direction that is substantially perpendicular to an axial direction of the steering shaft.

18. The vehicle according to claim 16, wherein the frame side support portion includes a bearing bracket.

19. The vehicle according to claim 12, further comprising a coupling pipe coupling said steering shaft and an input shaft of said power steering apparatus at a time of assembly so that said steering shaft and the input shaft are relatively movable in an axial direction and relatively immovable in a rotational direction such that a displacement between said steering shaft and the input shaft in the axial direction at the time of assembly is compensated for.

20. The vehicle according to claim 19, wherein said coupling pipe is a serration joint configured such that a serration provided on an inner peripheral surface of said coupling pipe is engaged with serrations provided on outer peripheral surfaces of said steering shaft and the input shaft, a slit is provided on said coupling pipe to penetrate said coupling pipe in an axial direction, and a fastening bolt fastening said coupling pipe in a radial direction is screwed into said coupling pipe.

21. The vehicle according to claim 12, wherein said plurality of bearings includes an upper bearing and a lower bearing; said upper bearing includes a bearing main body having an hourglass shaped inner surface projecting inwardly in a radial direction and rotatably supporting said steering shaft so as to compensate for inclination of said steering shaft with respect to the fixed reference axis and a bearing support portion supporting the bearing main body, and the bearing support portion is supported by a frame side support portion provided on said vehicle body frame; and said lower bearing is a ball joint having a ball portion having a substantially spherical shape projecting outward in a radial direction of said steering shaft and attached to a middle portion of said steering shaft and a ball support portion having a recessed spherical shape and slidably engaging with the ball portion, and the ball support portion is supported by a frame side support portion provided on said vehicle body frame.

22. The vehicle according to claim 21, wherein the frame side support portion includes a bearing bracket.

* * * * *

UNITED STATES PATENT AND TRADEMARK OFFICE
CERTIFICATE OF CORRECTION

PATENT NO.       : 7,182,169 B2                                    Page 1 of 1
APPLICATION NO.  : 10/975968
DATED            : February 27, 2007
INVENTOR(S)      : Yasuhiro Suzuki It is certified that error appears in the above-identified patent and that said Letters Patent is hereby corrected as shown below:

Title Page, Item (73): Assignee: Insert, Yamaha Hatsudoki Kabushiki Kaisha Shizuoka (JP)

Signed and Sealed this

Thirtieth Day of October, 2007

JON W. DUDAS
*Director of the United States Patent and Trademark Office*